(12) United States Patent
Sylvain

(10) Patent No.: US 7,366,183 B1
(45) Date of Patent: Apr. 29, 2008

(54) DETECTING MULTIMEDIA CAPABILITY OF A CALLER

(75) Inventor: Dany Sylvain, Gatineau (CA)

(73) Assignee: Nortel Networks Limited, St. Laurent (CA)

( * ) Notice: Subject to any disclaimer, the term of this patent is extended or adjusted under 35 U.S.C. 154(b) by 1131 days.

(21) Appl. No.: 10/439,518

(22) Filed: May 16, 2003

(51) Int. Cl.
*H04L 12/28* (2006.01)
(52) U.S. Cl. .................. 370/395.61; 370/401
(58) Field of Classification Search .......... 370/401
See application file for complete search history.

(56) References Cited

U.S. PATENT DOCUMENTS

2003/0202521 A1* 10/2003 Havinis et al. ............ 370/401

* cited by examiner

*Primary Examiner*—Creighton Smith
(74) *Attorney, Agent, or Firm*—Withrow & Terranova, PLLC

(57) ABSTRACT

The present invention allows a terminating telephony switch to detect whether or not a caller associated with an incoming call is associated with multimedia capability. The terminating telephony switch will monitor a call setup message, such as an Integrated Services User Protocol Initial Address Message, to determine whether or not there is multimedia capability information indicative of the caller's telephony terminal being associated with another media device, or including media capability sufficient to support packet sessions over a data network. The multimedia capability information may simply be the presence or absence of a flag, wherein the presence of a flag indicates there is multimedia capability. Alternatively, the call setup message may include the multimedia address associated with the media device of the caller. The originating telephony switch is configured to create call setup messages to provide multimedia capability information to enable the functionality of the terminating telephony switch.

42 Claims, 8 Drawing Sheets

US 7,366,183 B1

DETECTING MULTIMEDIA CAPABILITY OF A CALLER

FIELD OF THE INVENTION

The present invention relates to communications, and in particular to associating media capabilities with telephony calls over data and telephony networks.

BACKGROUND OF THE INVENTION

Given the ever-increasing desirability of combining voice and other media sessions, steps towards associating a traditional telephony device with a computing device are being made, such that voice sessions can be provided between two telephony devices and an associated video or data session is provided between the associated computing devices. In this fashion, traditional telephony networks are used to provide superior voice quality, while data networks are used to provide superior video and data session quality. For ease of reference, the computing devices, which are associated with respective telephony devices, are referred to as multimedia clients. An exemplary system is provided in U.S. application Ser. No. 10/028,510 filed Dec. 20, 2001, which is incorporated herein by reference in its entirety.

Providing such multimedia associations requires multiple entities in the data and telephony networks to determine if the parties associated with a voice session are associated with multimedia clients. As with any new technology, there are a few subscribers during initial deployment, and there is a need to minimize expenses and loads on network equipment that support the multimedia-services. Without an efficient system for identifying multimedia client availability, each of the telephony switches in the telephony network through which the call is routed would have to be modified to handle multimedia addressing capability, which would result in a very expensive and complex deployment. Given the relatively small number of subscribers in light of all telephony users, there is a need to alert the appropriate network equipment as to a subscriber's multimedia capability, instead of having to check the parties to each call to see if a multimedia client is associated with the respective parties. In this fashion, the network equipment impacted by the provision of multimedia services can gradually increase capacity as the number of subscribers to these services increases.

SUMMARY OF THE INVENTION

The present invention allows a terminating telephony switch to detect whether or not a caller associated with an incoming call is associated with multimedia capability. The terminating telephony switch will monitor a call setup message, such as an Integrated Services User Protocol (ISUP) Initial Address Message (IAM), to determine whether or not there is multimedia capability information indicative of the caller's telephony terminal being associated with another media device, or including media capability sufficient to support packet sessions over a data network. The multimedia capability information may simply be the presence or absence of a flag, wherein the presence of a flag indicates there is multimedia capability. Alternatively, the call setup message may include the multimedia address associated with the media device of the caller. The originating telephony switch is configured to create call setup messages to provide multimedia capability information to enable the functionality of the terminating telephony switch.

Both the originating and terminating telephony switches may interact with a service node to obtain multimedia client addresses for the caller or called party based on directory numbers provided in call signaling. The service node may initiate messaging sessions with the respective multimedia clients, and in particular, is effective in sending the multimedia address for a first multimedia client to that of a second multimedia client, such that the second multimedia client can communicate with the first multimedia client. In essence, the service node helps to facilitate either the caller or called party's multimedia client obtaining the multimedia address for the other party's multimedia client.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
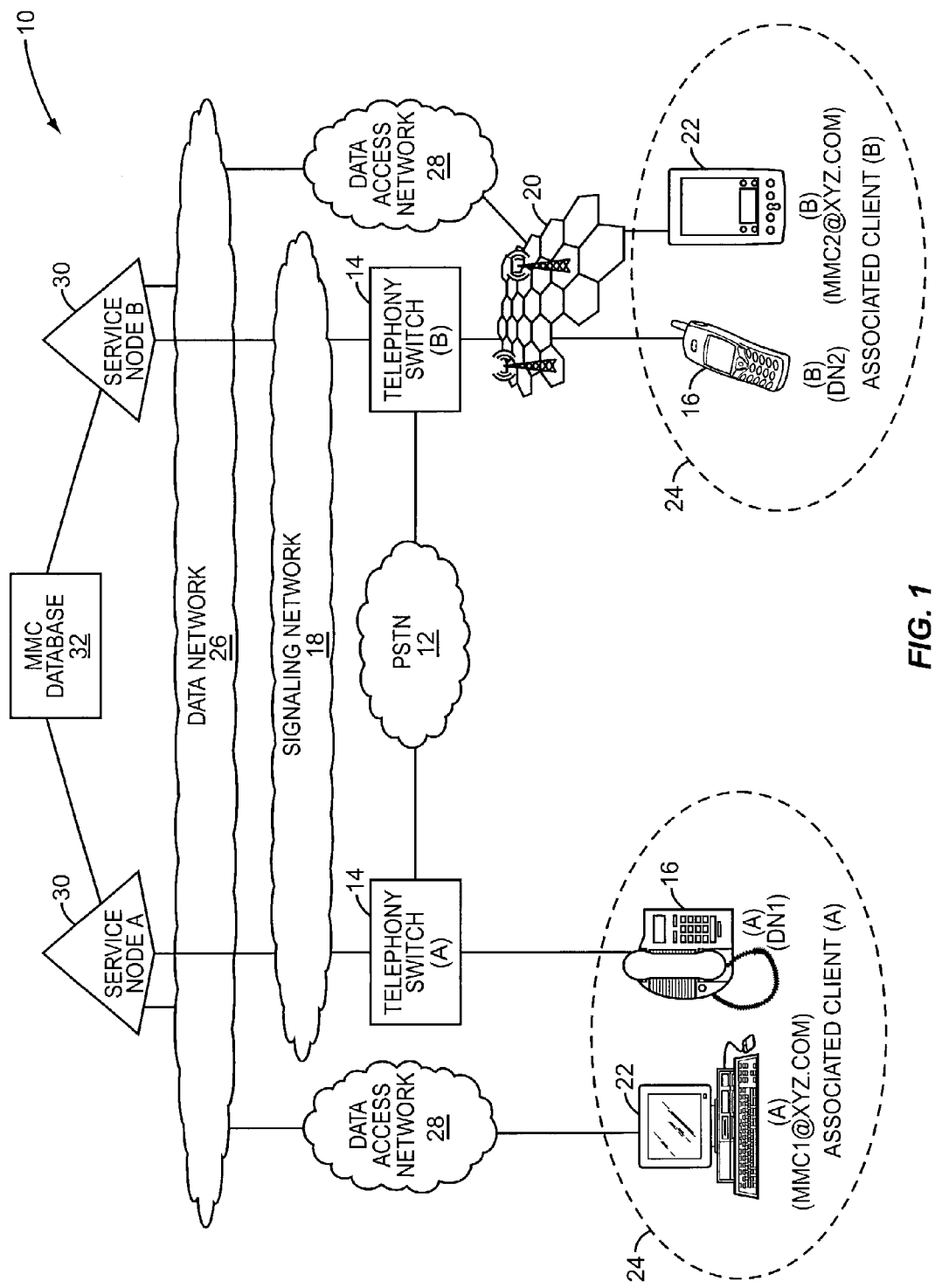
FIG. 1 is a block representation of a communication environment according to one embodiment of the present invention.

The present invention enables a traditional telephony switch for either wireline or wireless applications to more efficiently operate in a multimedia environment, wherein voice sessions through the traditional telephony network are associated with one or more media sessions facilitated through a data network. In general, the telephony switches supporting the communicating users' telephony devices need to determine whether the respective parties have media capabilities, which can be associated with a particular voice session or call. With the present invention, the call processing information exchanged during call setup provides for the originating telephony switch to indicate that the caller has multimedia capabilities. Such functionality is provided by extending existing telephony messages, such as the Integrated Services User Protocol (ISUP) messages, in a number of ways. If the caller does not have multimedia capabilities, unmodified call processing messages are used. The terminating telephony switch will process the messages indicative of an incoming call, and determine whether or not the calling party has multimedia capabilities based thereon. The terminating telephony switch can also determine if the called party has multimedia capabilities. If both the caller and called party have multimedia capabilities, the terminating switch will take the necessary steps to facilitate a media session between multimedia clients associated with the caller and called party. In general, the incoming call processing messages may be modified to include a flag, which indicates the calling party has multimedia capabilities, or the originating switch may include the address for the multimedia client of the caller in the incoming call processing message. The following description will illustrate exemplary call processing flows and incoming call processing messages illustrative of the concepts of the present invention. Prior to delving into these communication flows, an exemplary network architecture is described in association with FIG. 1.

As illustrated, a communication environment 10 is centered about a Public Switched Telephone Network (PSTN) 12. At the edges of the PSTN 12, telephony switches 14A and 14B support corresponding telephony devices 16A and 16B, such that calls may be established therebetween via the PSTN 12. Generally, a signaling network 18 facilitates the setup of calls between the telephony devices 16A and 16B by providing the appropriate instructions to telephony switches 14A and 14B, as those skilled in the art will recognize. The signaling network 18 may be a Signaling Systems 7 (SS7) network or the like, which is capable of controlling either wireline or wireless telephony switches 14. In the illustrated embodiment, telephony switch 14B is a wireless telephony switch, which is capable of interacting with proximate base stations 20 in a cellular network to facilitate wireless communications between the base stations 20 and wireless telephony terminal 16B.

The telephony terminals 16 are associated with multimedia clients 22, which may be personal computers, personal digital assistants, or any other computing device capable of facilitating packet-based data communications. As illustrated, multimedia client 22A is associated with telephony terminal 16A to form an associated client 24A. Similarly, multimedia client 22B is associated with telephony terminal 16B to form an associated client 24B. During multimedia sessions including voice and data sessions between the associated clients 24, the data sessions are facilitated between the multimedia clients 22 over a data network 26 using corresponding data access networks 28. In the wireless environment, the data access network 28 will interface with the base stations 20 to facilitate communications with the illustrated multimedia client 22B, which is a personal digital assistant with wireless capability. The voice session is established via a telephony call between the telephony devices 16.

The association between a telephony terminal 16 and a multimedia client 22 is facilitated by a service node 30, which is capable of communicating with the multimedia client 22 via the data network 26 and any necessary data access network 28, as well as communicating with the telephony switch 14 that supports the corresponding telephony terminal 16. For a multimedia session including voice and data sessions, the service node 30 will facilitate the data session with the multimedia client 22 as well as the voice session via the telephony switch 14 that supports the telephony device 16. Each service node 30 will likely support numerous associated clients 24, and in operation will detect the initiation of a data or voice session that is part of a multimedia session, and operate to assist in the establishment of a corresponding voice or data session, as the case may be. Preferably, a multimedia client (MMC) database 32 provides an association between directory numbers for telephony devices 16 and corresponding addresses for associated multimedia clients 22. The service node 30 can access the multimedia client database 32 to obtain addresses for multimedia clients 22 based on directory numbers, and vice versa to assist in the provision of multimedia sessions.

In general, the present invention allows the terminating telephony switch 14, the telephony switch supporting the called party, to determine whether the caller is associated with multimedia capabilities based on information provided in call setup messages. In one embodiment, the call setup messages are Integrated Services User Protocol (ISUP) Initial Address Messages (IAMs). If the called party is associated with multimedia capabilities, the ISUP IAMs may include a message, such as a flag, indicative of the presence of an associated multimedia client 22, the address on the data network 26 for the multimedia client 22, or a combination thereof. Importantly, the messages may take virtually any form that the terminating telephony switch 14 can use to determine whether the caller is associated with multimedia capabilities. The information provided with the ISUP IAM may indicate that there is no multimedia capability, or the ISUP IAM may not have any additional information, which the terminating telephony switch 14 will use to determine that there is no multimedia capability associated with the caller. Again, the caller is associated with multimedia capabilities if the caller's telephony terminal 16 is associated with a multimedia client 22 as described above, or if the caller is associated with a combined device having both voice and media capabilities, as will be described in FIG. 5.

Although the concepts of the present invention are applicable to various communication environments and related protocols, the present invention is preferably implemented using the session initiation protocol, which is commonly referred to as SIP. The specification for SIP is provided in the Internet Engineering Task Force's Request for Comments (RFC) 3261: Session Initiation Protocol Internet Draft, which is incorporated herein by reference in its entirety. In general, SIP is used to establish media sessions between any number of endpoints. Typically, these endpoints may support any number or combination of data, audio, and voice media sessions, depending on the configuration of the device. A SIP endpoint is capable of running an application, typically referred to as a user agent (UA), which is capable of facilitating media sessions using SIP. In certain embodiment, user agents may register their ability to establish sessions with a SIP proxy by sending REGISTER messages to the SIP proxy (not shown). The REGISTER message informs the SIP proxy of the SIP universal resource locator (URL) that identifies the user agent to the SIP network. The REGISTER message also contains information about how to reach specific user agents over the SIP network, typically by providing the Internet Protocol (IP) address and port that the user agent will use for SIP sessions. When a user agent wants to establish a session with another user agent, the user agent initiating the session may send an INVITE message to the SIP proxy and specify the target user agent in the TO header of the INVITE message. Identification of the user agent takes the form of a SIP URL. The SIP proxy will use the SIP URL in the TO header of the message to determine if the targeted user agent is registered with the SIP proxy. Generally the user name is unique within the name space of the specified domain.

If the targeted user agent has registered with the SIP proxy, the SIP proxy will forward the INVITE message directly to the targeted user agent. The targeted user agent will respond with a 200 OK message, and a session between the respective user agents will be established as per the message exchange required in the SIP specification. Media capabilities are passed between the two user agents of the respective endpoints as parameters embedded within the session setup messages, such as the INVITE, 200 OK, and acknowledgement (ACK) messages. Media capabilities may be exchanged in other messages, such as the SIP INFO message. Media capabilities are typically described using the Session Description Protocol (SDP). Once respective endpoints are in an active session with each other and have determined each other's capabilities, the specified media content may be exchanged during an appropriate media session.

According to the Internet Engineering Task Force's RFC 3261, a user agent is an application that contains both a user agent client and a user agent server. A user agent client generally refers to a client application that initiates SIP requests, wherein a user agent server is an application that contacts the user when a SIP request is received, and returns a response on behalf of the user. Typically, the response accepts, rejects, or redirects the received request.

Figure 2:
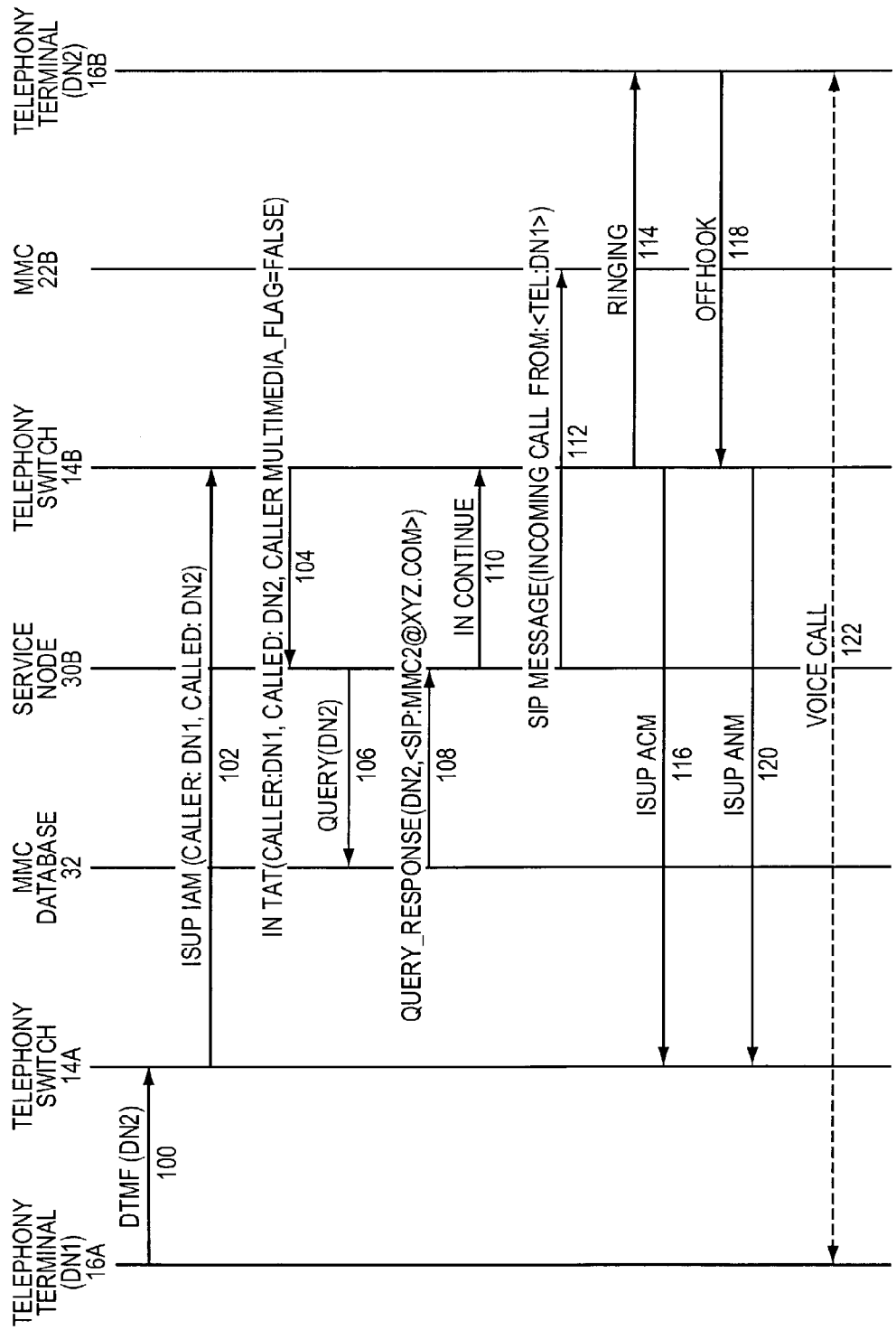
FIG. 2 is a communication flow diagram illustrating a first exemplary scenario according to the present invention.
Figure 3:
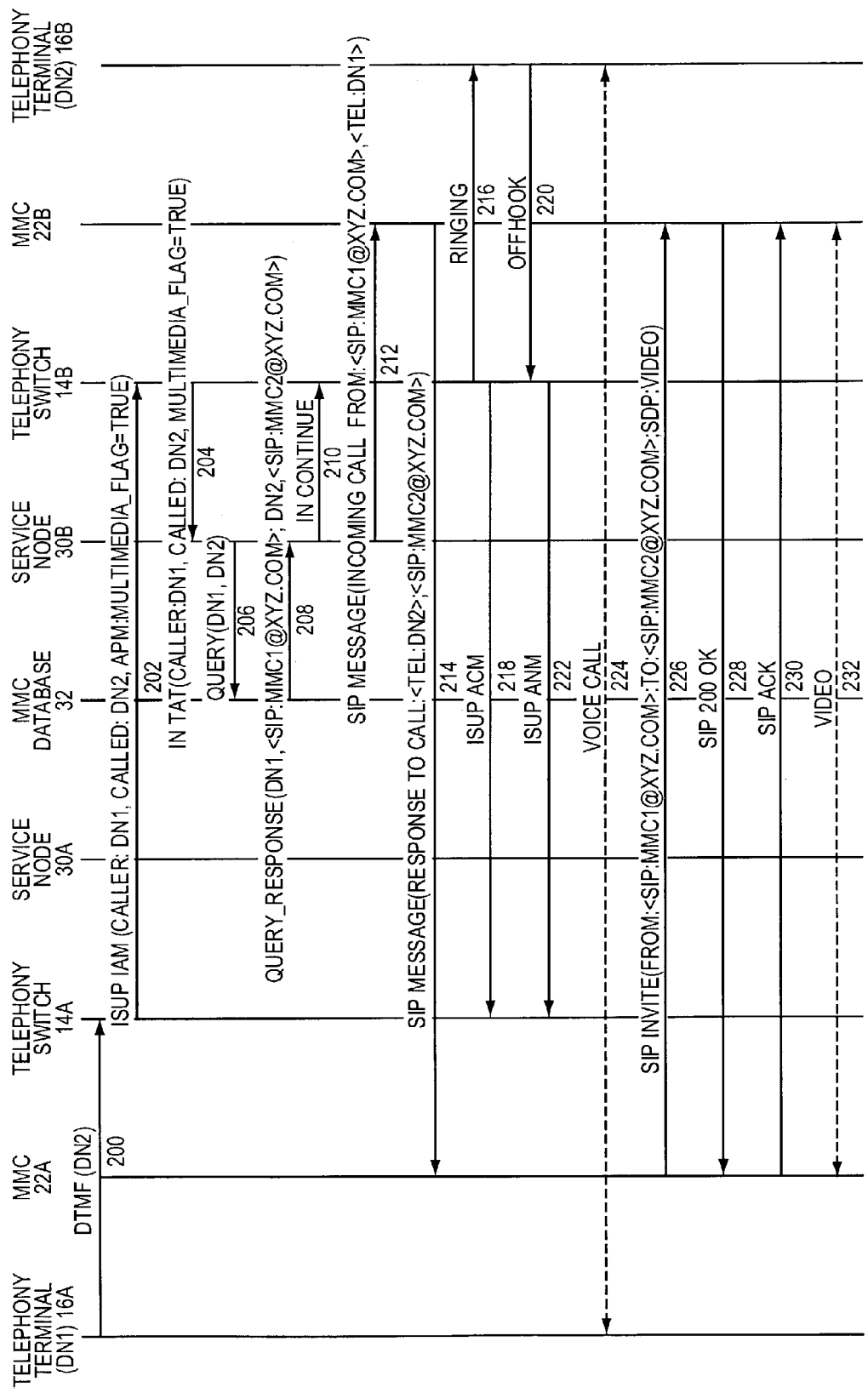
FIG. 3 is a communication flow diagram illustrating a second exemplary scenario according to the present invention.

FIGS. 2 and 3 illustrate two communication flows wherein the incoming ISUP IAM does not include additional information when the caller is not associated with multimedia capabilities, and does include additional information, in particular a flag, when the caller is associated with multimedia capabilities, respectively. With particular reference to FIG. 2, assume that the caller is associated with telephony terminal 16A, and that there is no multimedia client 22A associated with telephony terminal 16A or the caller. Further assume that telephony terminal 16A is associated with a directory number DN1, telephony terminal 16B is associated with directory number DN2, multimedia client 22B is associated with an address of MMC2@xyz.com, and the caller is originating a call from telephony terminal 16A to telephony terminal 16B.

To initiate the call, telephony terminal 16A will send dual tone multi-frequency (DTMF) digits corresponding to directory number DN2 to telephony switch 14A, which supports telephony terminal 16A (step 100). Telephony switch 14A will either be provisioned to know that telephony terminal 16A is or is not associated with a multimedia client 22 or will be able to access some entity to determine whether or not telephony terminal 16A is associated with a multimedia client 22. In this instance, telephony terminal 16A is not associated with a multimedia client 22, and as such, telephony switch 14A will send an ISUP IAM through the signaling network 18 to telephony switch 14B, which supports telephony terminal 16B (step 102). Notably, the ISUP IAM will not include information indicative of the presence of a multimedia client 22, but will be a normal ISUP IAM, which will identify the caller and the called party by their respective directory numbers, DN1 and DN2. When the ISUP IAM is ultimately routed to telephony switch 14B, it will process the ISUP IAM to determine whether telephony terminal 16A is associated with a multimedia client 22. Since the ISUP IAM does not have the additional information indicative of telephony terminal 16A being associated with a multimedia client 22, it will recognize that there is no multimedia capability associated with telephony terminal 16A (or the caller).

As such, telephony switch 14B can either initiate ringing of telephony terminal 16B to facilitate call connection, or access associated service node 30B to determine if any multimedia functions should be provided in association with the call, even though the incoming call will not be associated with a media session. Telephony switch 14B thus can send an Intelligent Network (IN) Termination Attempt Trigger (TAT) message to service node 30B (step 104). The IN TAT will preferably identify the caller and the called party by their respective directory numbers, and indicate that there is no multimedia capability associated with telephony terminal 16A, such as by indicating that the caller multimedia flag is false. Service node 30B may recognize that telephony terminal 16B is associated with multimedia client 22B, and in this example, will initiate sending a message identifying the incoming call to the multimedia client 22B.

Initially, service node 30B must identify the multimedia address for multimedia client 22B, and will access the multimedia client database 32 using the directory number for telephony terminal 16B to retrieve the multimedia address for multimedia client 22B (step 106). The multimedia client database 32 will use the directory number for telephony terminal 16B, and look up the multimedia address for multimedia client 22B, and then send a response back to service node 30B with the multimedia address, MMC2@xyz.com, for multimedia client 22B (step 108). Service node 30B will send an IN Continue message to telephony switch 14B, which will instruct telephony switch 14B to proceed with connecting the incoming call to telephony terminal 16B (step 110). Service node 30B can also send a SIP Message message to multimedia client 22B using the retrieved multimedia address (step 112). The message may be any type of message, such as simply sending a text message to multimedia client 22B indicating that an incoming call is being received from telephony terminal 16A or the caller, and that the caller does not have multimedia capability.

Meanwhile, telephony switch 14B will initiate ringing of telephony terminal 16B (step 114), as well as sending an ISUP Address Complete Message (ACM) back through the signaling network 18 toward telephony switch 14A (step 116). Once telephony terminal 16B is answered, an Offhook signal is detected by telephony switch 14B (step 118), which will forward an ISUP Answer Message (ANM) toward telephony switch 14A through the signaling network 18 (step 120). At this point, a voice call is established between telephony terminals 16A and 16B (step 122). From the above, the present invention allows the terminating telephony switch 14B to recognize that there is no multimedia capability associated with the caller, or telephony terminal 16A of the caller, by monitoring the information or lack thereof in the call setup message (ISUP IAM). Even though the incoming call will not be associated with a media session, telephony switch 14B initiates multimedia services by interacting with service node 30B, which will facilitate multimedia services.

Turning now to FIG. 3, assume that telephony terminal 16A is associated with multimedia client 22A, and that the incoming call setup message, such as the ISUP IAM, includes an additional flag indicative of the multimedia capabilities. Further assume that terminating telephony switch 14B can detect the presence of the multimedia client 22A, or detect the additional information provided in the setup message and interact with service node 30B to initiate the corresponding data session, as well as terminate the incoming call. The call from telephony terminal 16A to telephony terminal 16B is initiated when the caller dials the directory number of telephony terminal 16B and DTMF digits for directory number DN2 are received by telephony switch 14A (step 200). Telephony switch 14A will determine whether telephony terminal 16A is associated with a multimedia client 22, and in this case, there is an association with multimedia client 22A.

Accordingly, telephony switch 14A will generate an ISUP IAM, which includes additional information, in this case, an Application Transport Mechanism (APM) message indicating that multimedia capabilities are available, or that multimedia client 22A is associated with telephony terminal 16A. The ISUP IAM is sent toward telephony switch 14B through the signaling network 18 (step 202), and when telephony switch 14B receives the ISUP IAM, it will detect that telephony terminal 16A is associated with multimedia capabilities. At this point, telephony switch 14B only knows that telephony terminal 16A is associated with multimedia capabilities; the identity of multimedia client 22A is not yet determined.

Telephony switch 14B will then send an IN TAT message to service node 30B identifying the caller and the called party based on their directory numbers, as well as providing information indicating that the multimedia flag was set in the ISUP IAM (step 204). Service node 30B will use the directory numbers for telephony terminals 16A and 16B when sending a query to the multimedia client database 32 to identify the multimedia addresses for the respective multimedia clients 22A and 22B (step 206). The multimedia client database 32 will identify the multimedia addresses and send a response back to service node 30B providing the multimedia addresses for the multimedia clients 22A and 22B, along with the directory numbers for the corresponding telephony terminals 16A and 16B (step 208). Service node 30B will then send an IN Continue message to telephony switch 14B, which will take the necessary steps to terminate the incoming call at telephony terminal 16B (step 210). Service node 30B may also send a SIP Message message to multimedia client 22B providing any type of information desired in the select application, and more importantly, providing multimedia client 22B with the multimedia address for multimedia client 22A (step 212). In this manner, multimedia client 22B is not only made aware of the incoming call from telephony terminal 16A, but is also provided the address, which may include port information, for sending packets to multimedia client 22A to facilitate a data session. Multimedia client 22B will then respond by sending a SIP Message message to multimedia client 22A using the appropriate multimedia address, which will include the multimedia address of multimedia client 22B (step 214). As such, multimedia client 22A is provided the multimedia address for multimedia client 22B, and now has the necessary information for sending packets to multimedia client 22B to facilitate the data session.

Meanwhile, telephony switch 14B will initiate ringing of telephony terminal 16B (step 216), as well as send an ISUP ACM toward telephony switch 14A through the signaling network 18 (step 218). Once telephony switch 14B detects that telephony terminal 16B is answered by receiving an Offhook message (step 220), it will send an ISUP ANM toward telephony switch 14A through the signaling network 18 (step 222). At this point, the voice call is established between telephony terminals 16A and 16B (step 224). Further, multimedia clients 22A and 22B have the necessary information to communicate with each other. A session between multimedia clients 22A and 22B may be initiated by multimedia client 22A sending a SIP Invite message to multimedia client 22B using the appropriate multimedia address (step 226). For a video session, the SDP within the SIP Invite message may identify the session as video. Multimedia client 22B will take the necessary steps to configure itself to receive or transmit video packets, and send a SIP 200 OK message back to multimedia client 22A to acknowledge receipt of the SIP Invite message (step 228). In normal SIP fashion, multimedia client 22A will respond with a SIP Acknowledgement (ACK) message (step 230), wherein a video session is established (step 232).

Figure 4A:
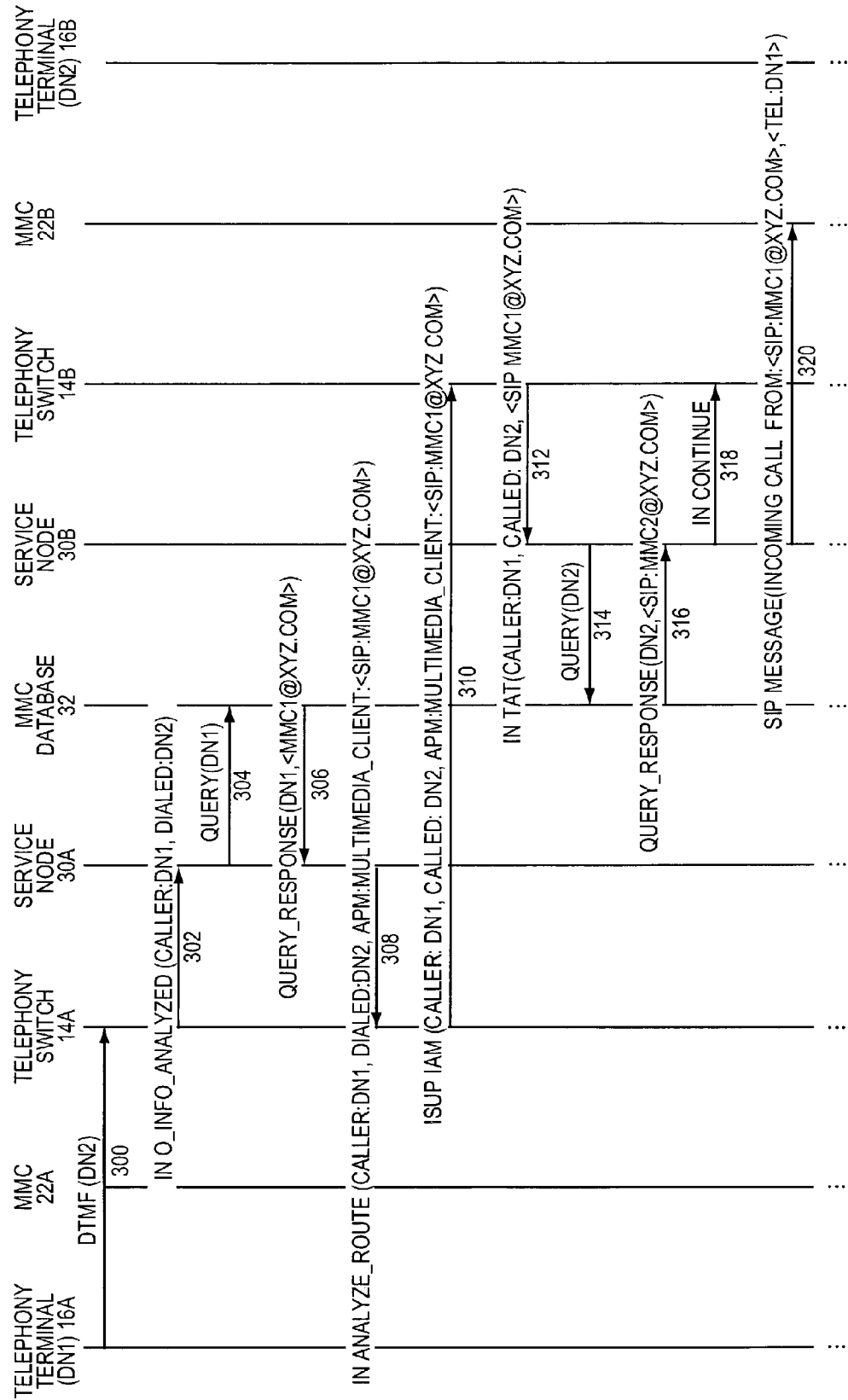
FIGS. 4A and 4B are a communication flow diagram illustrating a third exemplary scenario according to the present invention.
Figure 4B:
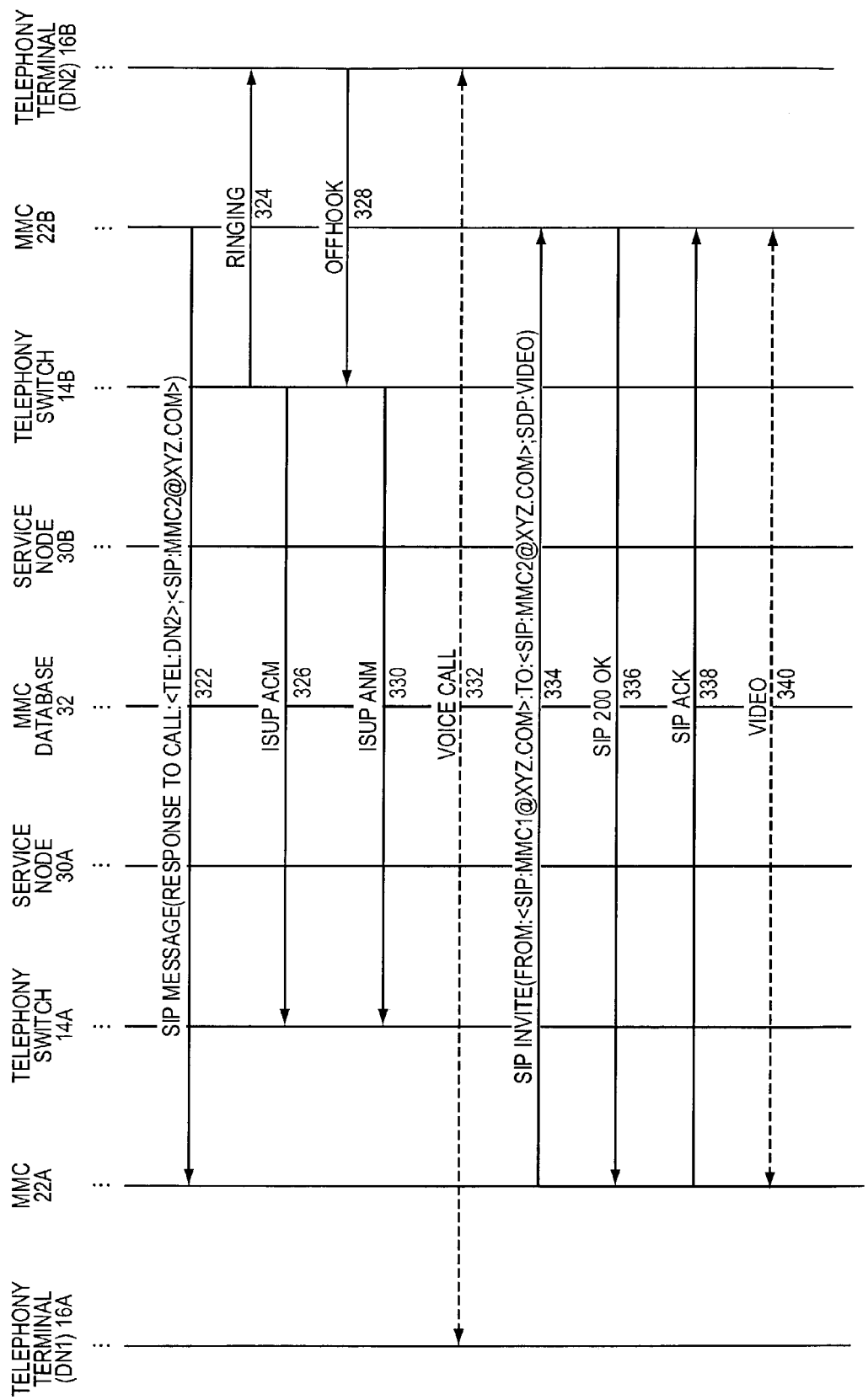

From the scenarios associated with FIGS. 2 and 3, the originating telephony switch 14A identified whether the telephony terminal 16A was associated with a multimedia client 22 by adding information in the setup message when such multimedia capability was available, and not adding any information when multimedia capability was not available. The additional information when multimedia capability was available did not identify the associated multimedia client 22 or provide any addressing information. In the scenario illustrated in FIG. 4, the originating telephony switch 14A is not only able to identify whether or not the calling party has multimedia capability, but will also use an associated service node 30A to identify the multimedia address for multimedia client 22A, which is associated with telephony terminal 16A.

Initially, telephony switch 14A receives DTMF digits from telephony terminal 16A when the caller desires to initiate a call to telephony terminal 16B (step 300). Upon receiving the DTMF digits for directory number DN2, telephony switch 14A will send an IN Information Analyzed message (O_Info_Analyzed) to service node 30A, wherein the message identifies the caller and the called party with their respective directory numbers DN1 and DN2 (step 302). Service node 30A will formulate a query, which is sent to the multimedia client database 32, identifying the directory number DN1 for telephony terminal 16A (step 304). The multimedia client database 32 will use the directory number DN1 for telephony terminal 16A to identify the multimedia address for multimedia client 22A. The multimedia client database 32 will send a response back to service node 30A identifying the multimedia address for multimedia client 22A (step 306). Service node 30A may then send an IN Analyze Route message to telephony switch 14A with additional information identifying the multimedia address for multimedia client 22A (step 308).

Continuing with originating the call, telephony switch 14A will send an ISUP IAM toward telephony switch 14B through the signaling network 18 (step 310). The ISUP IAM will identify the caller and called party by their respective directory numbers DN1 and DN2, as well as include the multimedia address for multimedia client 22A in the Application Transport Mechanism. Telephony switch 14B will receive the ISUP IAM and determine that telephony terminal 16A is associated with multimedia capability, and that the address for that capability (multimedia client 22A) is MMC1@xyz.com. Telephony switch 14B will at this point know the directory numbers for the caller and called party as well as the multimedia address for multimedia client 22A. To determine the multimedia address for multimedia client 22B, which is associated with telephony terminal 16B, an IN TAT message is sent to service node 30B, and includes at least the directory number for the called party, among other information (step 312). Service node 30B will use the directory number for telephony terminal 16B to form and send a query to the multimedia client database 32 (step 314).

The multimedia client database 32 will use the directory number for telephony terminal 16B to identify the multimedia address for multimedia client 22B and send an appropriate response back to service node 30B (step 316). Service node 30B will then instruct telephony switch 14B to continue with terminating the call at telephony terminal 16B using an IN Continue message (step 318), as well as sending a SIP Message message providing the multimedia address of multimedia client 22A to multimedia client 22B using the multimedia address for multimedia client 22B (step 320). Multimedia client 22B will then send a SIP Message message identifying the multimedia address for multimedia client 22B to multimedia client 22A (step 322).

In the meantime, telephony switch 14B will initiate ringing of telephony terminal 16B (step 324), as well as send an ISUP ACM toward telephony switch 14A via the signaling network 18 (step 326). Once telephony terminal 16B is answered, telephony switch 14B will recognize that telephony terminal 16B has gone offhook (step 328), and send an ISUP ANM to telephony switch 14A via the signaling network 18 (step 330). At this point, a voice call is established between telephony terminals 16A and 16B (step 332). The media session between multimedia clients 22A and 22B can be established by multimedia client 22B sending a SIP Invite message to multimedia client 22B (step 334). As with FIG. 3, assume the SIP Invite includes SDP for a video session. Multimedia client 22B will respond with a SIP 200 OK message (step 336), and multimedia client 22A will acknowledge receipt of the SIP 200 OK message with a SIP ACK message (step 338). At this point, the multimedia clients 22A and 22B have the necessary address and port information for sending video back and forth to facilitate a bi-directional video session in association with the voice call (step 340), wherein voice can be carried via the PSTN 12 and video can be carried via the data network 26.

Figure 5:
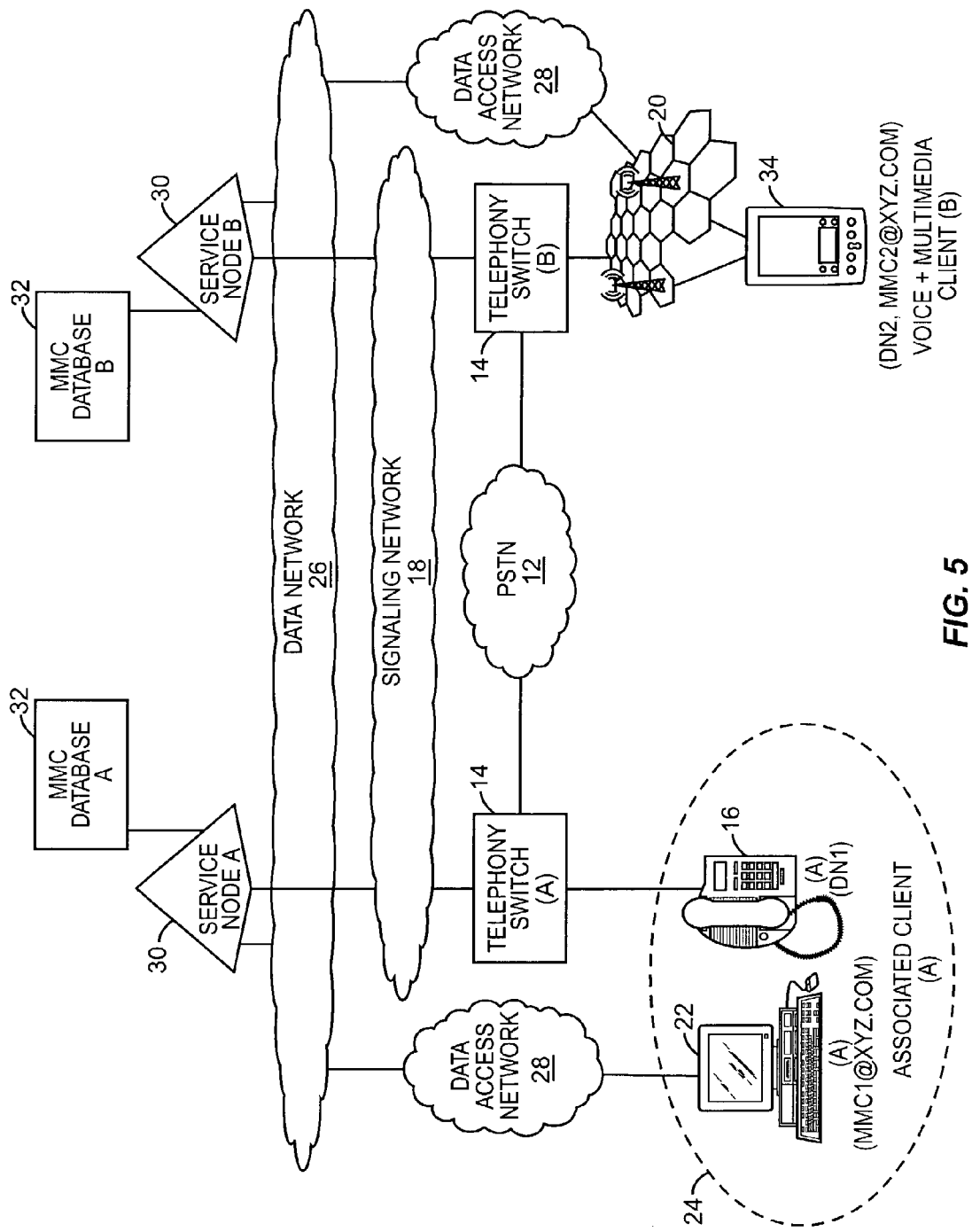
FIG. 5 is an alternative communication environment according to a second embodiment of the present invention.

Although the communication flows discussed above relate to separate multimedia clients 22 and telephony terminals 16, the relative functionalities can be combined into a single multifunctional device 34, such as the one illustrated in FIG. 5. Notably, the multifunctional device 34 can facilitate communications via the telephony switch 14 using wired or wireless circuit-switched technology, as well as via the data network 26 using wired or wireless packet technology. Further, each of the respective service nodes 30A and 30B can be associated with corresponding multimedia client databases 32A and 32B. Although not illustrated, telephony switches 14A and 14B could share a common service node 30, and provide the functionality described above.

Figure 6:
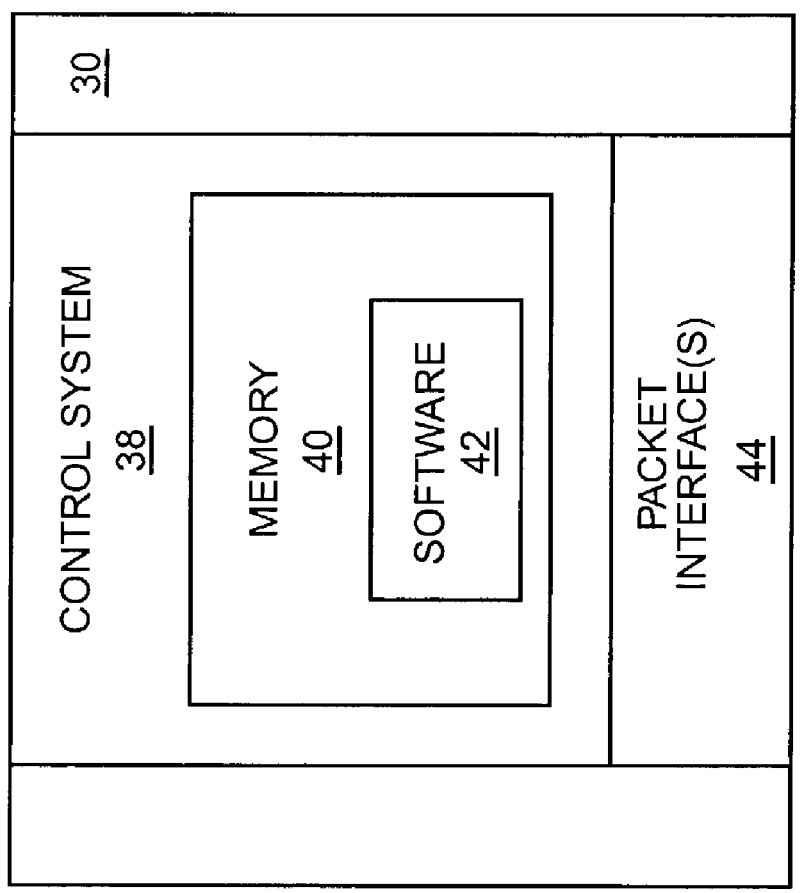
FIG. 6 is a block representation of a service node according to one embodiment of the present invention.

Turning now to FIG. 6, a block representation of a service node 30 is provided according to one embodiment of the present invention. The service node 30 will include a control system 38 having sufficient memory 40 for software 42, which facilitates the functionality of the present invention. The control system 38 will also be associated with one or more packet interfaces 44 to facilitate communications with the telephony switches 14 as well as the multimedia clients 22, in a direct or indirect fashion through one or more intermediate devices (not shown).

Figure 7:
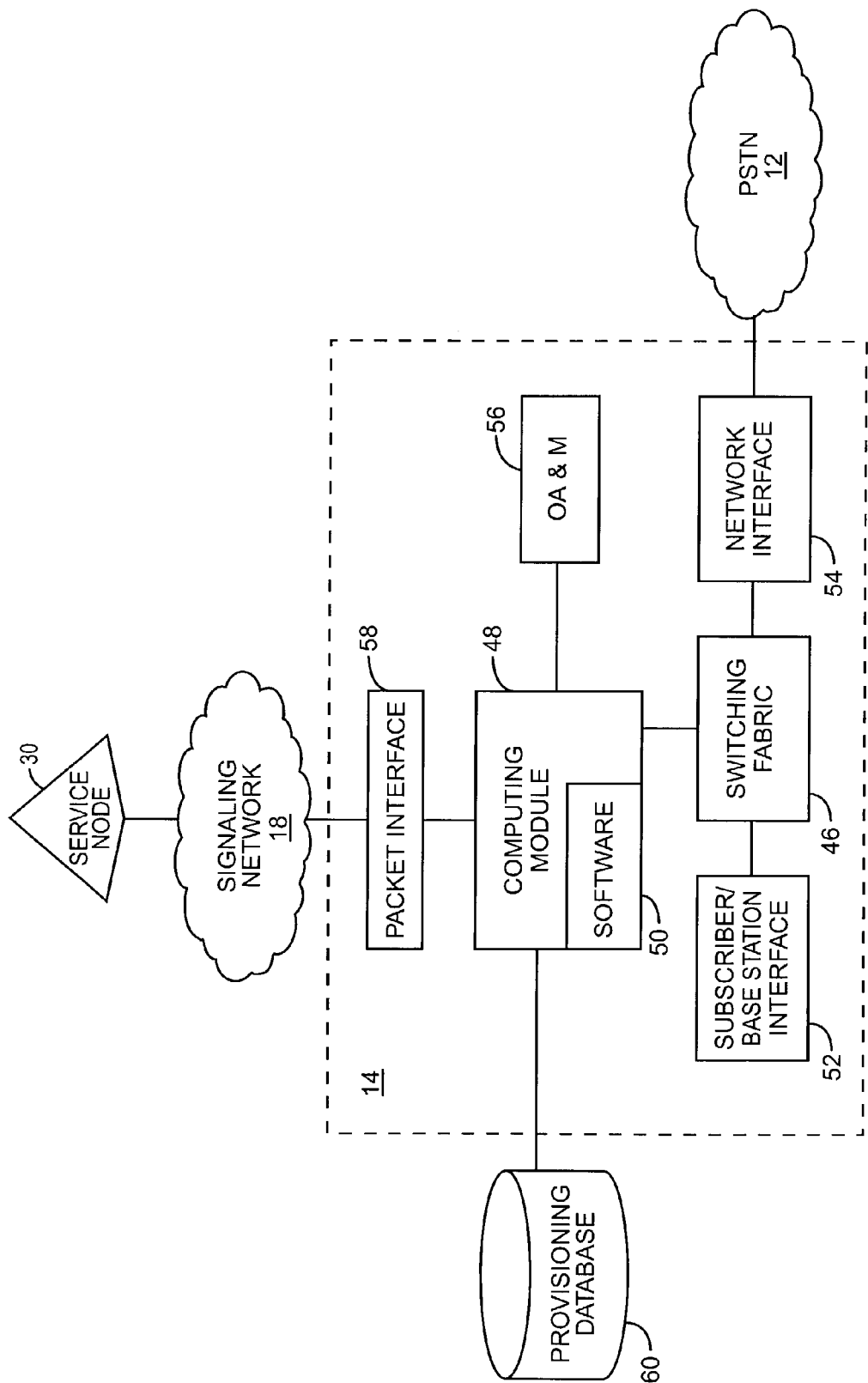
FIG. 7 is a block representation of a telephony switch according to one embodiment of the present invention.

Turning now to FIG. 7, a block representation of a telephony switch 14 is illustrated. The telephony switch 14 is represented generically and is intended to cover the logical functionality of land-based (wired) and mobile (wireless) switching systems, which may include control for call server-based functions. These telephony switches 14 may be implemented in a variety of ways using different equipment types, such as Nortel Networks Limited's DMS-100 local switching system. The switch 14 typically includes a switching fabric module 46, a computing module 48 including storage software 50, a subscriber/base station interface 52, a network interface 54, an operations/administration and maintenance (OA & M) module 56 and a packet interface 58. The switching fabric 46 may comprise logical and physical switches for interconnecting the subscriber/base station interface 52 with the remainder of the PSTN 12 through the network interface 54. Depending on a land-based or mobile embodiment, the subscriber/base station interface 52 will either directly support subscribers through subscriber lines or will support base stations 20, which facilitate wireless communications with mobile telephony devices. As illustrated, the computing module 48 controls circuit-switched communications via the switching fabric 46 and is capable of providing traditional intelligent network monitoring and functions. Further, the computing module 48 may cooperate with a provisioning database 60 to obtain configuration and operation rules and data. In operation, the software 50 of the computing module 48 is modified to monitor incoming call setup messages, such as an ISUP IAM, and determine whether the message has been modified to indicate that the caller associated with the message has multimedia capability as described above. Based on this information, as well as any need to access the service node 30, the software 50 will instruct the computing module 48 to either continue with establishing the call or access the service node 30 as indicated.

Those skilled in the art will recognize improvements and modifications to the preferred embodiments of the present invention. All such improvements and modifications are considered within the scope of the concepts disclosed herein and the claims that follow.

What is claimed is:

1. A method for terminating a telephony call to assist in determining if a caller is associated with multimedia capability comprising:
    a) receiving a call setup message indicative of an incoming call from a first telephony terminal of a caller to a second telephony terminal associated with a called party, wherein the call setup message includes multimedia capability indicia;
    b) determining if the first telephony terminal is associated with multimedia capability based on the multimedia capability indicia of the call setup message; and
    c) initiating delivery of a first multimedia address for a first multimedia client associated with the first telephony terminal to a second multimedia client associated with the second telephony terminal when the first telephony terminal is associated with multimedia capability.

2. The method of claim 1 further comprising determining if the second telephony terminal is associated with multimedia capability.

3. The method of claim 1 further comprising initiating delivery of a first message to a multimedia client associated with the second telephony terminal.

4. The method of claim 3 wherein initiating delivery of the first message further comprises sending a second message to a service node, which is capable of sending the first message to the multimedia client.

5. The method of claim 1 wherein the call setup message is an integrated services user protocol initial address message.

6. The method of claim 1 wherein the first telephony terminal is determined not to be associated with multimedia capability when the call setup message does not include the multimedia capability indicia indicative of the first telephony terminal being associated with multimedia capability.

7. The method of claim 1 wherein the multimedia capability indicia is a flag inserted into a standard call setup message.

8. The method of claim 1 wherein the multimedia capability indicia is a multimedia address for a multimedia client associated with the first telephony terminal such that incoming packets for a media session with the media device are sent to the multimedia address.

9. The method of claim 1 wherein the multimedia capability indicates a multimedia client for facilitating a packet based media session associated with a telephony call is associated with the first telephony terminal.

10. The method of claim 1 wherein initiating delivery of the first multimedia address further comprises sending a message including a first directory number of the first telephony terminal to a service node, which is capable of determining the first multimedia address and sending the first multimedia address to the second multimedia client.

11. The method of claim 1 wherein initiating delivery of the first multimedia address further comprises sending a message including the first multimedia address, which was provided in the call setup message, to a service node, which is capable of sending the first multimedia address to the second multimedia client.

12. The method of claim 1 further comprising connecting the incoming call to the second telephony terminal.

13. The method of claim 1 wherein the second telephony terminal provides the multimedia capability.

14. A method for originating a telephony call to assist in determining if a caller is associated with multimedia capability comprising:
 a) receiving first indicia from a supported telephony terminal associated with a first directory number, the first indicia providing a second directory number associated with a telephony terminal of a called party;
 b) determining if the supported telephony terminal is associated with multimedia capability,
 c) creating a call setup message including multimedia capability indicia indicative of the supported telephony terminal being associated with the multimedia capability, wherein the multimedia capability indicia is a multimedia address for a multimedia client associated with the supported telephony terminal such that incoming packets for a media session with the multimedia client are sent to the multimedia address; and
 d) sending the call setup message towards a terminating telephony switch supporting the telephony terminal of the called party.

15. The method of claim 14 wherein the call setup message is an integrated services user protocol initial address message.

16. The method of claim 14 further comprising creating the call setup message without including the multimedia capability indicia when the supported telephony terminal is not associated with the multimedia capability.

17. The method of claim 16 wherein the multimedia capability indicia is a flag inserted into a standard call setup message.

18. The method of claim 16 wherein the multimedia capability indicia is a multimedia address for a multimedia client associated with the supported telephony terminal such that incoming packets for a media session with the multimedia client are sent to the multimedia address.

19. The method of claim 14 wherein the multimedia capability indicia is a flag inserted into a standard call setup message.

20. The method of claim 14 wherein to determine if the supported telephony terminal is associated with the multimedia capability further comprises accessing a service node upon receiving the first indicia to obtain the multimedia address for the multimedia client.

21. The method of claim 14 wherein the multimedia capability indicates a media device for facilitating a packet based media session associated with a telephony call is associated with the supported telephony terminal.

22. A system for terminating a telephony call to assist in determining if a caller is associated with multimedia capability comprising a telephony switch adapted to:
 a) receive a call setup message indicative of an incoming call from a first telephony terminal of a caller to a second telephony terminal associated with a called party and including multimedia capability indicia;
 b) determine if the first telephony terminal is associated with the multimedia capability based on the multimedia capability indicia of the call setup message; and
 c) initiate delivery of a first multimedia address for a first multimedia client associated with the first telephony device to a second multimedia client associated with the second telephony terminal when the first telephony terminal is associated with the multimedia capability.

23. The system of claim 22 wherein the telephony switch is further adapted to determine if the second telephony terminal is associated with multimedia capability.

24. The system of claim 22 wherein the telephony switch is further adapted to initiate delivery of a first message to a multimedia client associated with the second telephony terminal.

25. The system of claim 24 wherein to initiate delivery of the first message, the telephony switch is further adapted to send a second message to a service node, which is capable of sending the first message to the multimedia client.

26. The system of claim 22 wherein the call setup message is an integrated services user protocol initial address message.

27. The system of claim 22 wherein the first telephony terminal is determined not to be associated with the multimedia capability when the call setup message does not include the multimedia capability indicia indicative of the first telephony terminal being associated with the multimedia capability.

28. The system of claim 22 wherein the multimedia capability indicia is a flag inserted into a standard call setup message.

29. The system of claim 22 wherein the multimedia capability indicia is a multimedia address for a multimedia client associated with the first telephony terminal such that incoming packets for a media session with the multimedia client are sent to the multimedia address.

30. The system of claim 22 wherein the multimedia capability indicates a multimedia client for facilitating a packet based media session associated with a telephony call is associated with the first telephony terminal.

31. The system of claim 22 wherein to initiate delivery of the first multimedia address, the telephony switch is further adapted to send a message including a first directory number of the first telephony terminal to a service node, which is capable of determining the first multimedia address and sending the first multimedia address to the second multimedia client.

32. The system of claim 22 wherein to initiate delivery of the first multimedia address, the telephony switch is further adapted to send a message including a first multimedia address, which was provided in the setup message, to a service node, which is capable of sending the first multimedia address to the second multimedia client.

33. The system of claim 22 wherein the telephony switch is further adapted to connect the incoming call to the second telephony terminal.

34. The system of claim 22 wherein the second telephony terminal provides the multimedia capability.

35. A system for originating a telephony call to assist in determining if a caller is associated with multimedia capability comprising a telephony switch adapted to:
a) receive first indicia from a supported telephony terminal associated with a first directory number, the first indicia providing a second directory number associated with a telephony terminal of a called party;
b) determine if the supported telephony terminal is associated with multimedia capability;
c) create a call setup message including multimedia capability indicia indicative of the supported telephony terminal being associated with the multimedia capability, wherein the multimedia capability indicia is a multimedia address for a media device associated with the supported telephony terminal such that incoming packets for a media session with the media device are sent to the multimedia address; and
d) send the call setup message towards a terminating telephony switch supporting the telephony terminal of the called party.

36. The system of claim 35 wherein the call setup message is an integrated services user protocol initial address message.

37. The system of claim 35 wherein the telephony switch is further adapted to create the call setup message without including the multimedia capability indicia when the supported telephony terminal is not associated with the multimedia capability.

38. The system of claim 37 wherein the multimedia capability indicia is a flag inserted into a standard call setup message.

39. The system of claim 37 wherein the multimedia capability indicia is a multimedia address for a multimedia client associated with the supported telephony terminal such that incoming packets for a media session with the multimedia client are sent to the multimedia address.

40. The system of claim 35 wherein the multimedia capability indicia is a flag inserted into a standard call setup message.

41. The system of claim 35 wherein to determine if the supported telephony terminal is associated with the multimedia capability, the telephony switch is further adapted to access a service node upon receiving the first indicia to obtain the multimedia address for the media device.

42. The system of claim 35 wherein the multimedia capability indicates a media device for facilitating a packet based media session associated with a telephony call is associated with the supported telephony terminal.

* * * * *